March 7, 1961     H. BERGER     2,974,228
CASSETTE CHANGING DEVICE FOR TAKING X-RAY PHOTOGRAPHS
Filed Aug. 18, 1958     4 Sheets-Sheet 1

Inventor,
Helmut Berger.
By
Atty.

March 7, 1961 H. BERGER 2,974,228
CASSETTE CHANGING DEVICE FOR TAKING X-RAY PHOTOGRAPHS
Filed Aug. 18, 1958 4 Sheets-Sheet 2

Inventor.
Helmut Berger.
By
Atty.

2,974,228
CASSETTE CHANGING DEVICE FOR TAKING X-RAY PHOTOGRAPHS

Helmut Berger, Erlangen, Germany, assignor to Siemens-Reiniger-Werke Aktiengesellschaft, Erlangen, Germany Filed Aug. 18, 1958, Ser. No. 755,553

Claims priority, application Germany Aug. 21, 1957

9 Claims. (Cl. 250—66)

This invention relates to X-ray apparatus and is particularly concerned with a cassette changing device adapted to limit the motion of cassettes, and if desired of the cassette carrier or carriage, with respect to different positions in which exposures are to be effected. Such cassette changing devices are required particularly for taking so-called "target" or "spot" pictures and for this purpose have in the radiation field in back the object to be examined a fluorescent screen on which the X-ray beam can be screened to the full cassette or film area or to a part thereof so that the operator can adjust the fluorescent screen and at the same time a cassette guiding frame coupled with the fluorescent screen to the detail of the object of which a radiograph is to be taken. For taking the radiograph the cassette is in the guide frame moved in front of the fluorescent screen—viewed in the direction of the beam—and is held there in position for the exposure. The motion of the cassette accurately into position for taking the radiograph was previously controlled by mechanical abutments. The mechanical abutments must be in different positions according to the size of the cassette used and according to whether the entire area of the inserted film is to be used only for a centrally focused picture (full size exposure) or for two or more juxtaposed pictures (part or serial exposure). If a special cassette carrier is not used for each size of cassette, adjustment of the abutments is also necessary when the cassette size has to be changed. To meet this requirement gearing has also been suggested whereby each cassette itself, on being inserted in the cassette carrier, adjusts the abutment for an individual radiograph or the abutments for part or serial exposures.

Accordingly, the previously known highly developed cassette changing device requires a considerable expenditure with respect to mechanical gear parts; the object of the present invention is to provide a cassette changing device of simple, reliable and efficient construction which avoids such expenditure.

According to the invention, there are provided electromagnets for limiting the path of movement of the cassettes and for holding the cassettes in the positions for radiographing, switch-in contacts being connected in parallel in the energizing circuit of said electromagnets, said switch-in contacts having operating elements which project into the path of the cassettes, in different positions coordinated to the different positions for radiographing, and a selector switch mechanism being provided for selecting from said parallel-connected switch-in contacts the one particular contact which is to become operative in connection with the respectively desired radiographing position.

Therefore, according to the invention, known mechanical abutments, the positions of which are adjustable, are replaced by a system of stationary switch-in contacts and a holding magnet. Instead of bringing a mechanical abutment into the guide path of the cassette or the cassette carrier, as was hitherto necessary, all the switch-in contacts, with the exception of the switch-in contact which has been selected, are rendered inoperative by electrical means. This contact selection can be effected automatically according to the size of the cassette inserted in the cassette changing device. The successive automatic selection of different contacts when producing part or serial exposures side by side, can also be effected by electrical means, for example by a system of relays. The substitution of electrical switching elements for mechanical gearing can therefore effect a considerable saving in the cost of production in the case of functionally complicated cassette changing devices.

A preferred embodiment of the invention is illustrated by way of example in the accompanying drawings, in which Fig. 1 shows a cassette changing device in front elevation;

Figure 1:
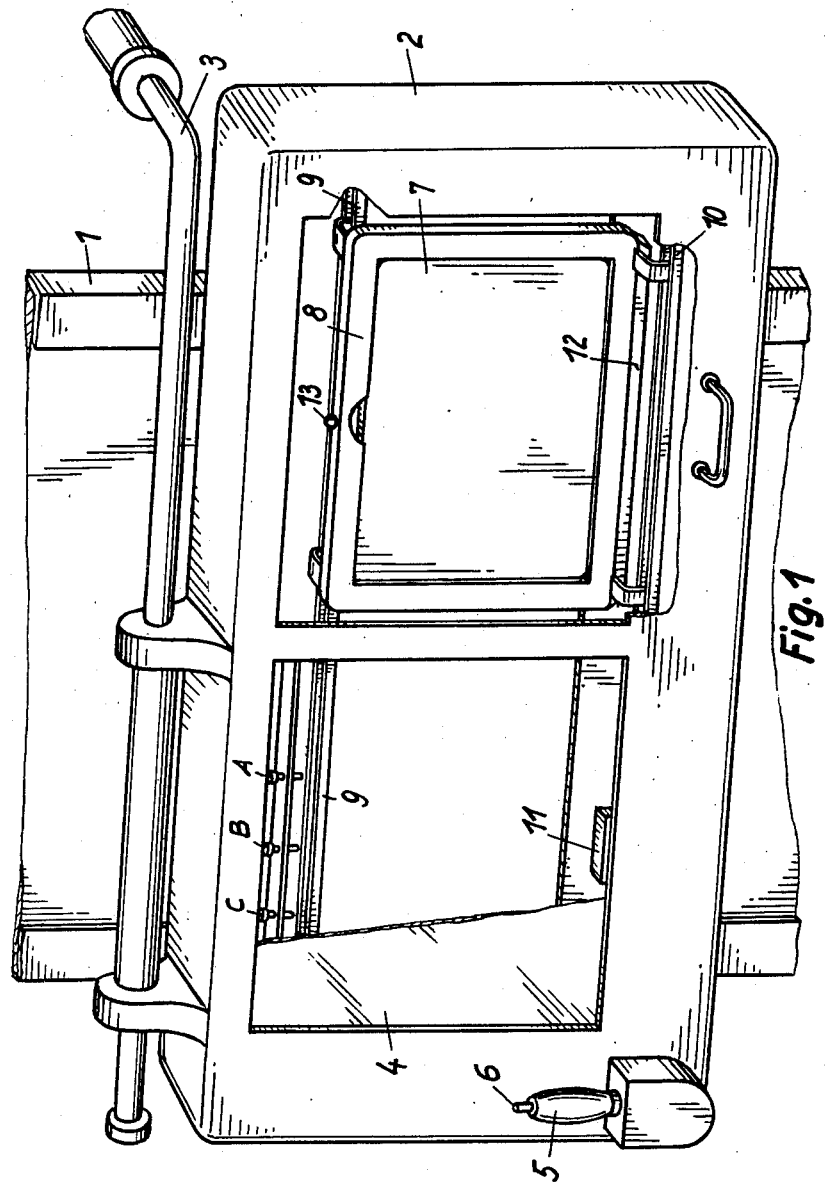

According to Fig. 1, the carrier frame 2 of a target or spot radiograph apparatus is carried laterally slidable on a carrier arm 3 in front of a patient leaning against a wall 1 the arm 3 being in turn in suitable not illustrated manner movable upwardly and also in the direction of the beam. The fluorescent screen 4 of the target apparatus can thus be aimed at the organ to be examined of the patient leaning against the supporting wall 1. By means of a releasing knob 6 fitted on a handle 5, a film cassette 7 in a cassette carriage 8 is automatically moved along rails 9 and 10 into the position for exposure in back of the fluorescent screen 4 where it is stopped in a predetermined position, whereupon the X-ray radiograph is taken. It is assumed that the X-ray picture covers either the whole film size or the half thereof, which can be attained by suitably screening out the X-ray beam with the aid of stops or diaphragms. If only half the film area is to be used for the radiograph, it is possible to take on one film two radiographs side by side by stopping the feed-in motion of the cassette if it is braked in the correct position.

The limiting of the feed in of the cassette, which was previously attained by mechanical stops or abutments, is according to the invention effected by a holding magnet 11 past which an armature bar 12 fixed on the cassette carriage 8 can slide unimpeded during the feed-in motion of the cassette as long as no current is supplied to the coil of the holding magnet 11. The cassette carriage 8 can be stopped by energizing the holding magnet 11. In order to effect this in the desired position, there are provided three switch-in plugs A, B, C which project into the path of a trip cam 13 carried by the cassette carriage. The mechanism by means of which only one switch-in element, selected according to the desired exposure position, becomes at any time effective for energizing the holding magnet 11, will now be described with reference to Fig. 2.

Fig. 2 again shows diagrammatically the film cassette 7, the cassette carriage 8, with the armature bar 12 and the trip cam 13, the guide rails 9 and 10, the holding magnet 11 and the switch-in elements A, B, C.

Figure 2:
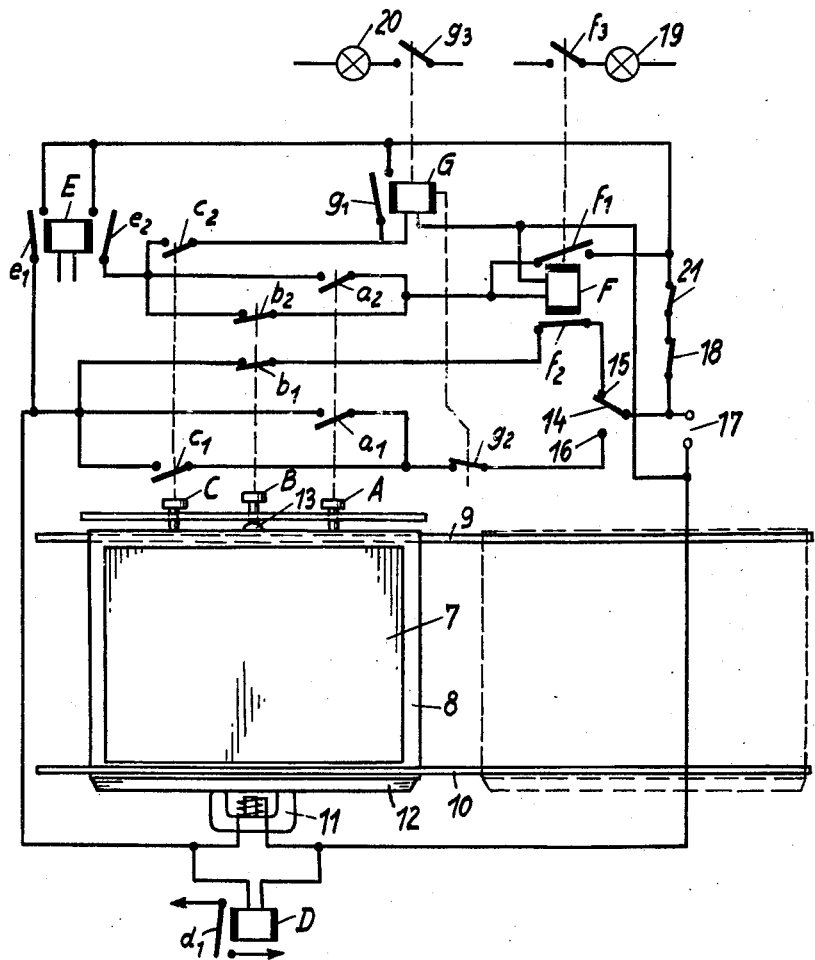
Fig. 2 is a circuit diagram for controlling the electromagnets of the device.

A selector switch 14 is provided for effecting an adjustment according to whether the whole film is to be used or whether it is to be divided into two parts. If the exposure is to occupy the whole film, the selector switch 14 is placed in engagement with contact 15, as illustrated in Fig. 2. Upon moving the cassette carriage 8 into the exposure position, the switch-in element A is first actuated by the trip cam 13. However, since the switching circuit associated therewith is interrupted at a contact 16, the holding magnet 11 will not be energized. Energization of the holding magnet 11 takes place only when the trip cam 13 actuates the contact member B because the holding magnet 11 is then connected with a source of current 17 over the closed selector switch 14, the contact 15 and another contact $b_1$. The holding force of the magnet 11 can be so dimensioned that only a slight slip of the cassette carriage 8, amounting to a maximum of 2 millimeters, takes place upon stopping. A relay D connected in parallel with the magnet 11 closes a contact $d_1$ which is disposed in the exposure release circuit of the X-ray apparatus and is intended to prevent an exposure being made before the cassette 7 has reached the ready-position. If necessary, a retarding element, arranged for example in the diaphragm driving mechanism, may be provided to ensure that the exposure takes place only after sufficient time has elapsed following the stopping of the cassette carriage, to allow the vibrations or oscillations caused by the sudden braking of the cassette motion have had time to subside and to prevent a blurred picture. A device for braking or stopping the cassette motion as far as possible without vibrations, will be presently described with reference to Fig. 3.

At the commencement of the exposure relay E, disposed in parallel with an exposure switch, is actuated and contact $e_1$ thereof maintains the energization of the holding magnet 11 until the exposure is terminated. A second contact $e_2$ of the relay E feeds current to relay F via a closed contact $b_2$. A holding contact $f_1$ maintains current on relay F even when the contacts $b_2$ and the contact $e_2$ are opened following the exposure. A normally closed contact $f_2$ of relay F opens the circuit for the holding magnet 11 at the commencement of the exposure so that, at the end of the exposure and the opening of the contact $e_1$, holding magnet 11 releases the cassette carriage 8. To prevent double exposures, the circuit of the holding magnet 11 cannot be closed via the switch-in plug B before the cassette 7 has been changed. This is attained by the previously mentioned normally closed contact $f_2$ of the relay F which remains open as long as the relay F remains energized via a closed contact 18. The contact 18 is only opened when the cassette 7 is removed from the cassette carriage 8. A third contact $f_3$ of the relay F causes a signal lamp 19 to illuminate to indicate the exposure of the film.

If the film area is to be used for taking two radiographs side by side, the contact blade of the selector switch 14 is in engagement with the contact 16. At the same time a screening plate or shutter, not shown in the drawings, is shifted into the radiation field, such shutter having a diaphragm aperture corresponding to half the size of the cassette 7. This adjustment of the screen can also be effected automatically by coupling with the adjustment of the selector switch 14. When the cassette carriage 8 is now moved into the radiation field screened to half the width of the cassette, a switch-in contact $a_1$ cooperatively associated with the switch-in element A first acts as closing contact for the circuit of the holding magnet 11. Upon commencement of the exposure, the relay F now receives current by way of the closed contacts $e_2$ and a contact $a_2$ and remains operated by way of its contact $f_1$. The contact $f_3$ of relay F again causes the lamp 19 to signal that an exposure has been made and, by opening the contact $e_1$, the holding magnet 11 is disconnected. When the cassette carriage 8 is now shifted further towards the left, for making a second exposure, the holding magnet 11 is placed under current via a switch-in contact $c_1$ by actuating the switch-in plug element C and consequently the cassette carriage 8 is held in desired position. A relay G is now energized by way of switch-in contact $c_2$ and closes a holding circuit for itself via a contact $g_1$. A normally closed contact $g_2$ of the relay G prevents the holding magnet 11 from being again energized over the contact $c_1$ as long as the contact 18, actuated by the changing of the cassette 7, does not interrupt the energizing of the relay G.

A second signal lamp 20 controlled via contact $g_3$ of the relay G indicates that both fields of the inserted film have been exposed.

The blocking of the exposure can also be cancelled by means of another contact 21 which is actuated by changing the position of the cassette in the cassette carriage. Such change in position of the cassette is provided for, for example, when the film area is also to be subdivided in horizontal direction. After effecting two or more exposures side by side in horizontal direction all of which occupy only the upper half of the film, the cassette is shifted in the cassette carriage in vertical direction and can then be used for taking further pictures along the lower half of the film.

If the above described cassette changing device is also to be used for other sizes of cassette which require other positions for exposure than those determined by the switch-in elements or plugs A, B, C, suitable additional switch-in plugs with switching circuits cooperatively associated therewith and additional contacts for the selector switch 14 are provided for selecting these switching circuits. If desired, the selection of the switching circuits can be effected automatically by the insertion of the cassette, as is known per se in the case of mechanical abutments. An example of such an arrangement will now be described.

Figure 3:
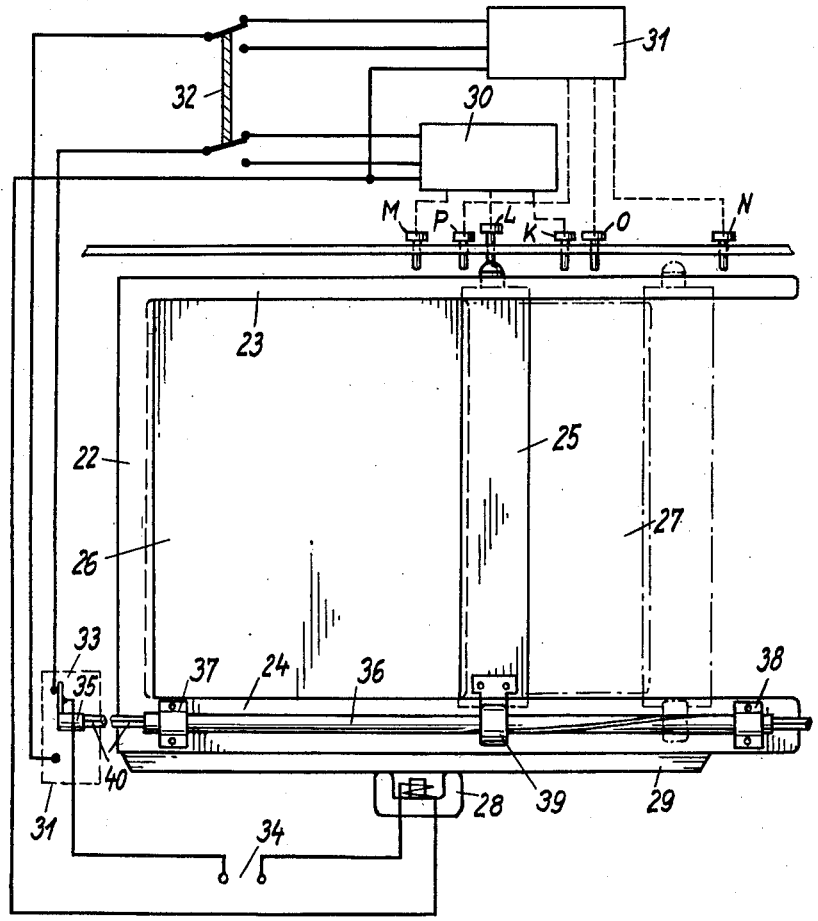
Fig. 3 shows also in front elevation a frame-shaped cassette carrier.

Fig. 3 shows a frame-shaped cassette carrier (cassette frame) comprising three fixedly interconnected bars 22, 23, 24 and a bar 25 which is shiftable parallel to the bar 22. By adjusting the bar 25, the width of the frame can be adapted to the width of the cassette to be used. In Fig. 3 a cassette 26 is assumed to be placed in the frame. The position of the bar 25 for another wider cassette 27 is indicated in dot-dash lines. In the case of known arrangements, different widths of cassettes required different mechanical abutments for correctly limiting the insertion distances of the cassettes for whole or part exposures; in accordance with the invention, a special set of switch-in plugs with contacts cooperatively associated therewith and switching circuits for a holding magnet 28 which cooperates wtih an armature bar 29 fixed on the bar 24, are provided for the width of the respective cassettes.

Two such switch-in plug sets K, L, M and N, O, P are illustrated in Fig. 3, the switch-in plugs L and O serving for taking full-sized pictures and the switch plugs K, M and N, P for subdivided exposures. The contacts and switching circuits respectively associated therewith, the arrangement and construction of which have for each system been already described in connection with Fig. 2, are for simplification only indicated by block symbols 30 and 31. Each system is connected with the holding magnet 28. A selector switch 32 having two switching positions serves for setting the desired kind of picture (full-size or divided into two). The adaptation of the changing device to the size of an inserted cassette is effected automatically by a switch 33 which connects either the system 30 or the system 31 to a source of current 34 for the holding magnet 28 through the intermediary of the selector switch 32. For the automatic operation of the switch 33, the switching shaft 35 thereof is connected with a spiral guide 36 which is rotatably mounted in bearings 37 and 38 on the bar 24. A nut 39 engages the spiral guide 36, such nut being fixed on the shiftable bar 25 so that the spiral guide 36 is rotated when the bar 25 is shifted. As a cassette is being introduced, the spiral guide 36 slides on a square rod 40 rotatable in the housing of the viewing or "target" apparatus so that the square rod 40 rotates with the spiral guide 36. The square rod 40 is coupled with the switching shaft 35 of the switch 33 which is thereby switched over when the bar 25 is shifted. By suitably selecting the steepness of pitch of the spiral guide 36 and a corresponding arrangement of switch contacts of the switch 33, the latter is switched over according to the size of the inserted cassette. It will be understood that the arrangement described for two different sized cassettes can be applied in simple manner to cassettes of three or more different widths.

The selection of different sets of switch-in plugs according to the different sizes of cassettes can also be effected, for example, by arranging the sets of switch-in plugs in different parallel paths along the feed-in path of the cassettes, and automatically rendering a trip cam operative, for example by displacement, for the set of switch-in plugs provided for the size of the inserted cassette.

The use of holding magnets according to the invention, instead of mechanical abutments for the cassette automatically moving into the position for exposure, for example with the aid of a motor, permits braking the cassette motion with far less vibration than is possible when using mechanical abutments. It is known that braking causes the least oscillation if the braking action follows a sine function, that is when the drop in speed first increases, attains a maximum and then decreases down to zero. A braking device will now describe the action of which produces a sine-shaped speed characteristic and is practically independent of the kinetic energy of the fed-in cassette.

Figure 4:
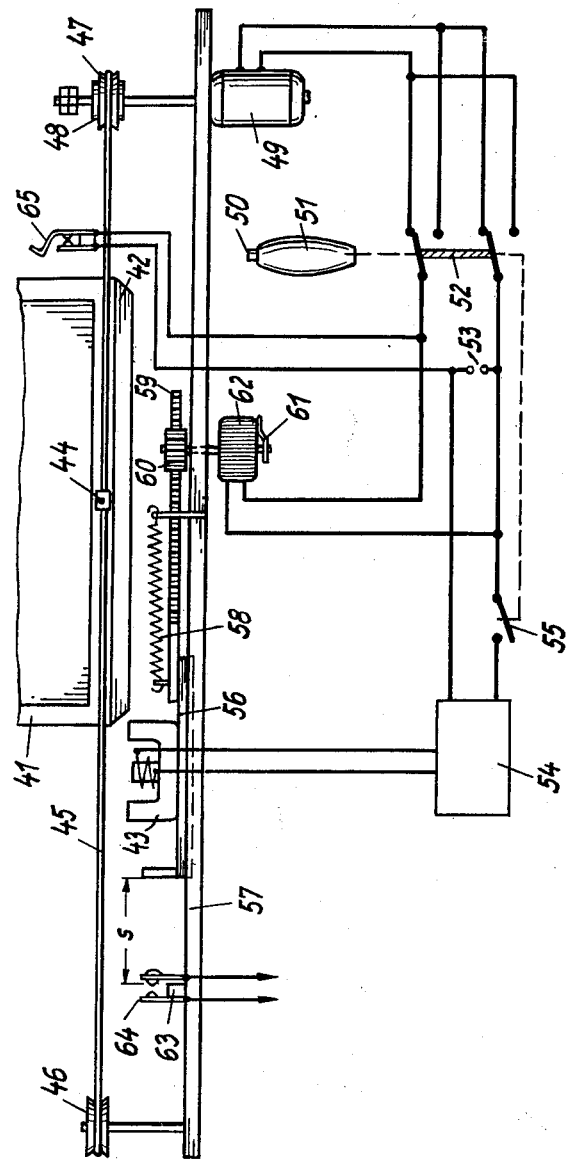
Fig. 4 is a similar view of the lower part of a cassette frame.

Fig. 4 shows the lower part of a cassette frame 41 with an armature bar 42 for a holding magnet 43. The cassette frame 41 is connected at 44 with an endless cord 45 which is guided over grooved pulleys 46 and 47. The pulley 47 is in driving connection with a reversible motor 49 through the medium of a slip clutch 48. By means of a button 50, which is arranged in a handle 51 for moving the whole cassette changing device so that it can be actuated by the thumb of the hand gripping the handle 51, the motor 49, preferably a direct current shunt-wound electric motor is, through the medium of a switch 52 poled in such a manner that the motor guides the cassette frame 41 to the left into position for exposure through the medium of the slip clutch 48 and the endless cord 45. When the cassette frame 41 reaches a predetermined position, the holding magnet 43 receives current from a source of direct current 53 over the switch arrangement already described in connection with Figs. 2 and 3 and here indicated by a block symbol 54, and over a contact 55 which is closed by the button 50 being depressed, and consequently adheres firmly to the armature bar 42. The holding magnet 43 is mounted on a carriage 56 slidable in the direction of the cassette movement on a rail 57 and is therefore carried along by the cassette frame 41 against the pull exerted by a return spring 58. At the same time a toothed ratchet 59 rigidly connected with the holding magnet 43 is also shifted which, through the medium of a pinion 60 and a contact lever 61 controls a variable resistor 62 parallel to the armature of the motor 49 and in the course of its movement continually reduces the ohmic value of the variable resistor 62. By suitably dimensioning variable resistor 62 it is possible to effect sinusoidal braking of the carriage 56 of the cassette frame 41 by the falling revolutions of the armature of the motor 49. After travelling a distance $s$, the braking magnet contacts an abutment 63 and at the same time actuates a contact 64 which initiates the X-ray exposure. During the exposure the holding magnet 43 is pressed against the abutment 63 by the action of the motor 49 through the medium of the cassette frame 41, the cord 45 and the slip clutch 48. Upon release of the button 50, the holding magnet 43 is switched off at the contact 55 and at the same time the motor 49 is reversed so that the cassette frame 41 is moved back into the viewing position. In this position a switch-off contact 65 of the motor is actuated by the cassette frame 41.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A cassette changing device for use in taking spot and serial radiographs, comprising a movable cassette carrier, an electromagnet for limiting the path of movement of said cassette carrier, a circuit for energizing said electromagnet, a plurality of switch-in contacts disposed in parallel in said energizing circuit, actuating elements respectively cooperatively associated with the respective switch-in contacts and projecting at predetermined points into the path of movement of said cassette carrier in different positions respectively related to different exposure positions, and a mechanism for selecting from said parallel connected switch-in contacts at least one such switch-in contact to become operatively effective response to actuation, by said cassette carrier, of the actuating element cooperatively associated with the selected switch-in contact.

2. A device according to claim 1, wherein said selecting mechanism comprises, for use in taking serial radiographs, a selector switch for simultaneously selecting all switch-in contacts cooperatively related to the exposure position for taking the corresponding serial radiographs, and a relay arrangement cooperating with said selector switch for automatically rendering operative selected switch-in contacts in the desired sequence.

3. A device according to claim 1, comprising a trip cam carried by said cassette carrier, said actuating elements for said switch-in contacts being constructed in the form of switch-in plugs projecting into the path of said trip cam.

4. A device according to claim 1, for use in connection with cassettes of different size, comprising operating means responsive to the insertion of a cassette for automatically selecting predetermined switch-in contacts for a cassette of predetermined size, said operating means comprising switch means for controlling said selection, and means for transmitting to said switch means the movement of the movable cassette carrier.

5. A device according to claim 1, comprising contact means controlled by an exposure contact of the associated X-ray apparatus for maintaining said electromagnet energized for the duration of the corresponding exposure.

6. A device according to claim 1, comprising circuit means including a contact for initially energizing said electromagnet, said contact opening after energization of said electromagnet, and a relay for thereafter maintaining said electromagnet energized.

7. A device according to claim 1, comprising circuit means including a contact for initially energizing said electromagnet, said contact opening after the energization of said electromagnet, and a switch controlled by the change in position of the cassette in relation to the cassette carrier for thereafter maintaining said electromagnet energized.

8. A device according to claim 1, comprising means for disposing said electromagnet for limited displacement, stop means for said electromagnet, and means for checking the displacement of said electromagnetic and the movement of said cassette into exposure position until stopping of said electromagnet by said stopping means.

9. A device according to claim 8, comprising a motor for moving said cassette, and an element cooperating with said electromagnet for regulating the revolutions of said motor.

References Cited in the file of this patent

UNITED STATES PATENTS

| | | |
|---|---|---|
| 2,709,221 | Haupt et al. | May 24, 1955 |
| 2,823,315 | Stava et al. | Feb. 11, 1958 |
| 2,834,890 | Bastin et al. | May 13, 1958 |